United States Patent [19]

Phillips et al.

[11] Patent Number: 4,953,579

[45] Date of Patent: Sep. 4, 1990

[54] QUICK ACTING DIVERSION VALVES

[76] Inventors: Robert E. Phillips, 12217 Iredell St., Studio City, Calif. 91601; Ben A. Otsap, 7661 Airport Blvd., Los Angeles, Calif. 90045

[21] Appl. No.: 17,321

[22] Filed: Feb. 20, 1987

[51] Int. Cl.$^5$ .............................................. G05D 7/01
[52] U.S. Cl. ........................... 137/106; 137/624.14; 137/625.66; 137/625.69; 251/75; 91/193; 91/318; 91/344; 91/518
[58] Field of Search .............. 137/106, 624.14, 625.66, 137/625.69; 251/61, 61.2, 75; 91/191, 193, 318, 344, 517, 518

[56] References Cited

U.S. PATENT DOCUMENTS

| | | | |
|---|---|---|---|
| 2,072,403 | 3/1937 | Lausen | 137/106 |
| 2,573,680 | 11/1951 | Arnold | 251/61 |
| 2,698,517 | 1/1955 | Witt | 91/318 X |
| 2,812,055 | 11/1957 | Wenger | 91/318 X |
| 2,814,310 | 11/1957 | Lower | 251/75 X |
| 3,703,188 | 11/1972 | Wagner | 251/75 X |
| 3,722,525 | 3/1973 | Epple | 137/106 |
| 3,794,075 | 2/1974 | Stoll et al. | 251/75 X |

OTHER PUBLICATIONS

Yeager, Franklin P., Hydraulic and Pneumatic Power and Control (McGraw-Hill, 1966), pp. 190–196.

Primary Examiner—John Rivell
Attorney, Agent, or Firm—Edward D. O'Brian

[57] ABSTRACT

A quick acting diversion valve can be constructed so that a pressure difference between the sides of a bistable diaphragm can be used to cause the diaphragm to change in configuration so as to move a valve body in a housing in order to change the manner in which passages or ports in the housing are connected.

7 Claims, 3 Drawing Sheets

QUICK ACTING DIVERSION VALVES

BACKGROUND OF THE INVENTION

The invention set forth in this specification pertains to new and improved valves. More specifically it pertains to quick acting valves which are primarily intended to be used as diversion valves in diverting fluid flow from one port or line to another in response to a differential in the pressures in the two chambers.

The term "diversion valves" used in the preceding indicates the nature of the difference between valves of this invention and many other prior valves. The valves of the invention are primarily intended to be used in directing the flow of either a pneumatic or a hydraulic fluid from a supply or pressure line to either a single other line or to a series of other lines. Unlike many other valves they are not intended to be used in regulating or modulating the flow between a supply line and other lines.

Because of the latter, many diversion valves have been constructed so that they achieve an "on" or "off" action as rapidly as reasonably possible. As a consequence of the latter many of these diversion valves are referred to as "quick acting" or "quick action" valves. Since the broad concepts of the invention can be employed in valves which quickly operate so as to achieve an "on" or "off" action the various valves of this invention can be referred to as "quick acting" valves.

Many different valves capable of being described as either quick acting or diversion valves have been proposed and used. The number of types of such prior valves is considered to be so large as to make it impractical to describe them all and to discuss the pros and cons of their constructions. While prior valves capable of being described as quick acting or diversion valves have been extensively known and used and are unquestionably highly utilitarian, it is considered that there exists a need for new and improved valves capable of being designated as quick acting or diversion valves.

More specifically it is considered that there is a need for new and improved valves capable of being described by either of these designations which are less expensive than prior related valves and which nevertheless possess performance characteristics which are at least as good or better than the performance characteristics of prior related valves. Although it is possible to amplify on this latter statement it is not considered necessary to do so. The desirability of lowering the cost of an device without detrimentally affecting its performance or while improving its performance is considered to be self-evident. The term "performance" is a generic expression conveying not only the actual operation of a device such as a valve but in addition coveying other items such as reliability and ease of service.

BRIEF SUMMARY OF THE INVENTION

An objective to the invention is to provide new and improved quick acting and/or diversion valves to fulfill the need indicated in the preceding discussion. Thus, the invention is intended to provide valves which are less expensive to manufacture than prior closely related valves. It is also intended to provide valves having desirable performance characteristics. Included within the latter are many factors which it is not considered necessary to individually enumerate in this document. It is noted, however, that the invention is intended to provide valves which will operate satisfactorily over a reasonably long period and which may be easily serviced as needed. The invention is also intended to provide valves which can be operated as motors.

It is obvious that the specific performance characteristics of a valve will depend upon the details of how the valve is constructed. As will be subsequently indicated in detail, valves of the invention are preferably constructed so as to be useful as "sequencers." Valves of the latter category are used so as to provide fluid pressure to a series of lines in accordance with a predetermined sequence. Sequencing valves of this invention are considered to be particularly useful in providing a pneumatic fluid—normally air—to a series of elements such as inflatable bags or tubes. Such valves are normally employed as or in the manner of servo valves. When the preferred valves of the invention are used for sequencing purposes, they are preferably employed in a unit consisting of two of such valves. The valves of the invention can usually be operated with pneumatic fluids, but can be operated with known hydraulic fluids. They can also be operated with a vacuum.

In accordance with this invention the various objectives indicated in the preceding discussion are achieved by providing a valve including a housing, said housing having an internal cavity, inlet and outlet ports located in said housing so as to lead into the interior of said cavity, said valve also including a valve body located within said cavity, said valve body being capable of being moved between a first position in which it places said inlet port in communication with said outlet port and second position in which it closes off said outlet port, said valve also including actuating means for moving said valve body between said first and second positions connected to said valve body in which the improvement comprises:

said actuating means including wall means defining a hollow cavity, a diaphragm means having two positions of stability located within said cavity and having its periphery held by said wall means so as to divide said cavity into two compartments, a first control port leading through said wall means into a second of said compartments, a second control port leading through said wall means into a second of said compartments, and mechanical means connecting the center of said diaphragm means to said valve body, said diaphragm means, said mechanical means and said valve body being physically related so that in a first stable position of said diaphragm means said valve body is in said first position and in the second stable position of said diaphragm means said valve body is in said second position, and said diaphragm means being responsive to the fluid pressure differential between said compartments so as to be oriented in either of said positions of said diaphragm means in accordance with such differential.

BRIEF DESCRIPTION OF THE DRAWINGS

Because of the nature of the invention it is best more fully explained with reference to the accompanying drawings in which.

DETAILED DESCRIPTION

Figure 6:
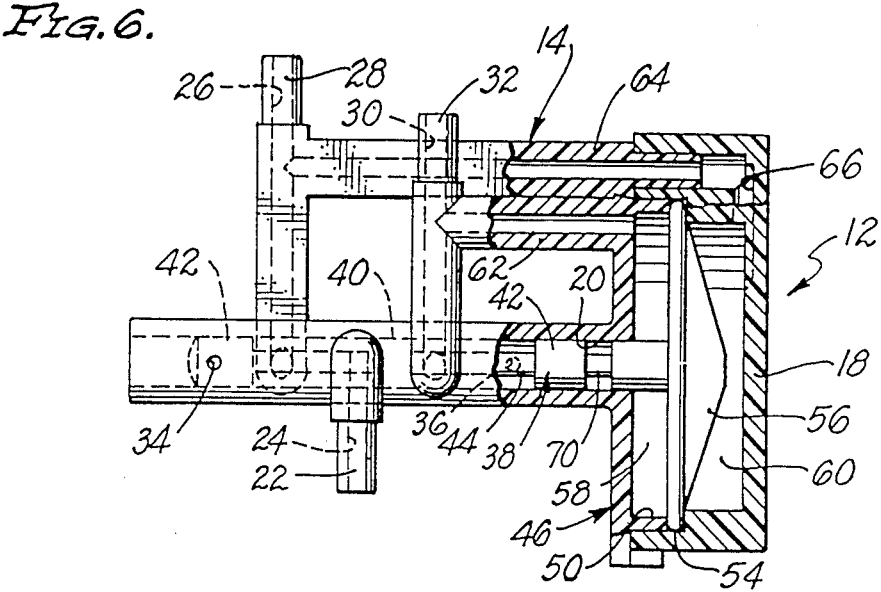
FIG. 6 is a view corresponding to FIG. 1 of a single valve corresponding to one of the valves utilized in the structure shown in FIG. 1, this view being partially in section.

In FIGS. 1 to 5 of the drawings there is shown a composite, dual valve structure 10 which, in effect, includes two separate valves 12, each of which is constructed in the manner in which the valve 12 shown in FIG. 6 is constructed. This valve structure 10 is considered to be particularly suitable for use as a pneumatic, quick acting diversion valve in sequentially inflating a series of elongated tubes or tubular areas in a pillow or similar structure (not shown) in order to gently massage a person using the pillow or other structure in that the use of two valves 12 in it as subsequently described is considered to effectively make it impossible for the structure 10 to even be placed in an equilibrium condition such that it will not operate or work when used in a presently intended manner.

In order to facilitate an understanding of the invention the same numerals are used in FIGS. 1 to 6 to designate the same or corresponding parts as shown in these figures even though the valve 12 as shown in FIG. 6 differs from the valve structure 10 shown in FIGS. 1 to 4 in that the valve structure 10 includes two of the valves 12 as previously noted. This inclusion of the two valves 12 in the valve structure 10 is accomplished by forming a single housing body 14 in connection with the valve structure 10 so that it includes or carries two of each of the parts hereinafter described. The expression "housing body 14" as used in this specification is employed to designate either the housing body 14 of a single valve 12 or the unitary housing body 14 of the two valves 12 incorporated with the valve structure 10 as the text may indicate.

This housing body 14 in both cases is a part of the complete housing 16 including either an end cap 18 in the valve 12 shown in FIG. 6 or, in the case of the housing body 14 in the valve structure 10, two end caps 18. In each case both the housing body 14 and the end cap(s) 18 are preferably formed out of an relatively rigid, inert material such as any of the many polymer compositions or metals used for rigid housings at the current time. In order to achieve economies of manufacturing, these parts are preferably formed out of a thermoplastic polymer by conventional injection molding techniques so as to include the various parts subsequently indicated.

Each valve 12 includes in its housing 16 an elongated, open ended internal cavity 20 which is preferably in the form of a cylindrical bore. For this reason in the subsequent discussion each cavity 20 will be referred to as a bore 20 in order to facilitate an understanding of the valves 12. A small extension or nipple 22 which is adapted to be connected to a source of fluid under pressure (not shown) or a vacuum source (not shown) is located on each housing body 14 as shown. An inlet passage or port 24 is located so as to extend through each extension 22 and so as to intersect the bore 20 of the body 14 on which the extension 22 is located approximately midway along the length of the bore 20.

Service or supply passages or ports 26 and 30 are located within other extensions or nipples 28 and 32, respectively, so as to lead from the bores 20 at equal distances from the ports 24 along the lengths of the bores 20. If desired these ports 26 and 28 can be termed outlets. Further, return or vent ports 34 and 36 extending into the bores 20 are located on the housing bodies 14 at equal distances from the inlet ports 23 along the lengths of the bores 20. If desired, members or nipples corresponding to the extensions 22, 28 or 32 can be used in connection with the vent ports 34 and 36 to convey the return of spent fluid back to a receptacle (not shown). They are not used on the valves 12 since these valves are intended for use with a pneumatic fluid-specifically compressed air.

These ports 34 and 36 are located further from the ports 24 than the ports 26 and 30. In effect with this structure the ports 26 and 34 are located to one side of the port 24 and the ports 30 and 36 are located to the other side of the port 24 along the length of the bore 20 within a valve 12. This structure is to enable a valve body 38 to be shifted within each bore 20 so as to achieve a valving action. Each valve body 38 used in a valve 12 is formed in the manner of a common valve spool and, hence, for convenience of explanation is referred to in the following discussion as a valve spool 38. Each valve spool 38 includes a central cylinder 40 and terminal cylinders 42 joined together by a centrally located shaft 44. These cylinders 40 and 42 all fit closely within the bore 20 within which they are located so as to be capable of forming or nearly forming a seal with the interior of such bore 20. However, they do not fit so tightly as to preclude movement of the valve spool 38 of which they form a part.

It will be noted that each valve spool 38 is capable of being moved between a first position as shown in which it is located such that the inlet port 24 is in communication with a supply port 26 and is isolated from the other supply port 30 and such that the vent port 34 adjacent to the supply port 26 is closed off while the vent port 36 adjacent to the supply port 30 is in communication with this port 30 and is open to the ambient air and a second position in which the inlet port 24 is in communication with the supply port 30, the supply port 26 is in communication with ambient air through the vent port 34 and the vent port 36 is closed off.

Within the valve 12 the movement of the valve spool 38 between these two positions is accomplished through the use of what are referred to herein as "actuating means" 46. Such actuating means 46 in each valve 12 includes an enlarged end extension 48 on and forming a part of the housing body 14. The extension 48 in a valve 12 is generally cylindrical and includes a part of an internal cylindrical cavity 50 which is in axial alignment with and in communication with the bore 20. In a valve 12 the remainder of this cavity 50 is generally within an end cap 18. The cap 18 serves to close off on the extension 48 adjacent to it.

When the cap 18 is in place as shown in a valve 12, it holds or clamps the periphery 54 of a bistable diaphragm 56 in place against the extension 48 so as to divide the cavity 50 into a first compartment 58 and a second compartment 60. The first compartment 58 is in communication with the supply port 30 through a first tubular connector 62 while the second compartment 60 is in communication with the supply port 26 through a second tubular connector 64 and a small passage 66 located within the cap 18. The center 68 of the diaphragm 56 is mechanically connected to the terminal cylinder 42 on the valve spool 38 by means of a motion transmitting shaft 70. This shaft 70 is normally sufficiently thick so that it will not easily bend; it may appear as merely a continuation of the terminal cylinder 42 to which it is attached as shown.

Figure 1:
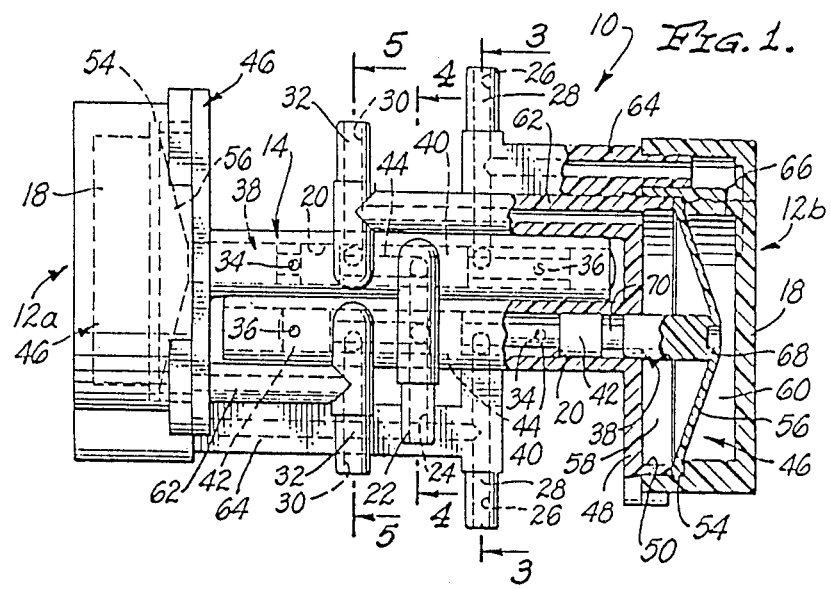
FIG. 1 is a side elevational view of a presently preferred embodiment of dual valve structure of the invention, this view being partially in section.
Figure 2:
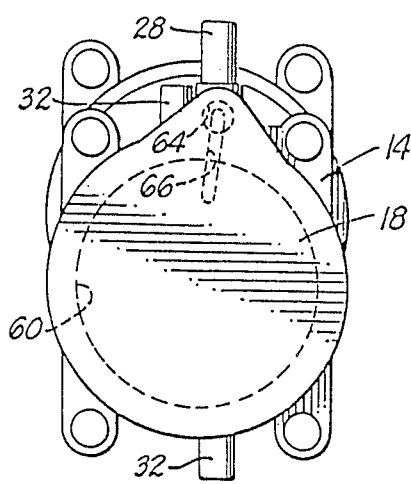
FIG. 2 is an elevational view of the right end of the valve shown in FIG. 1.
Figure 3:
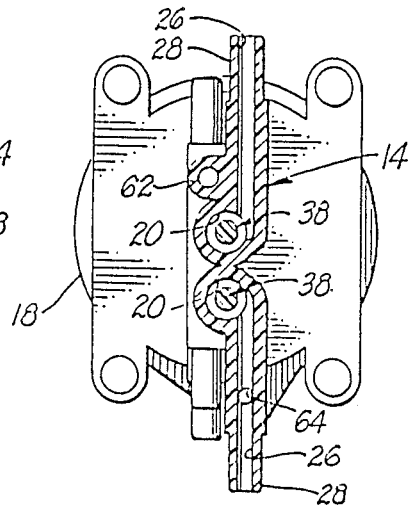
FIG. 3 is a cross-sectional view taken at line 3—3 of FIG. 1.
Figure 4:
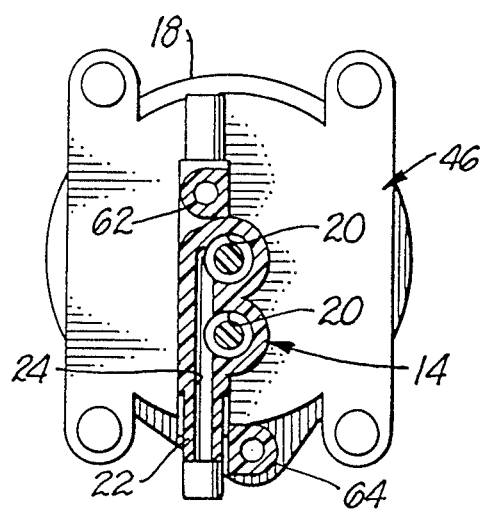
FIG. 4 is a cross-sectional view taken at line 4—4 of FIG. 1.
Figure 5:
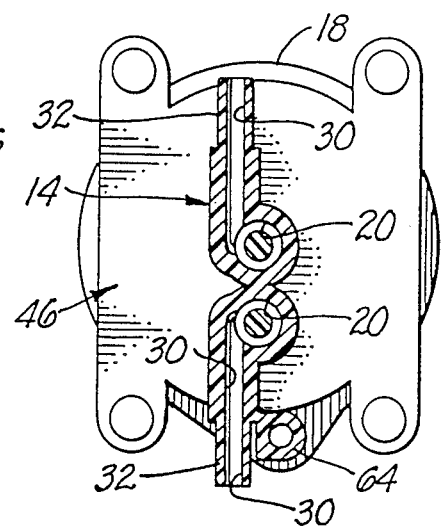
FIG. 5 is a cross-sectional view taken of line 5—5 of FIG. 1.

The construction of this diaphragm 56 is considered to be quite important in connection with the valve 12. It must be shaped and constructed of a material capable of deflecting between a position as shown in FIG. 1 or FIG. 6 in which it is more or less conical in shape and is pointed generally away from the remainder of the valve 12 to a reverse position in which it is also more or less conical in shape and is pointed in the reverse direction. Further, a diaphragm 56 must be of such a character that when a pressure differential is applied across it as a result of the pressures in the adjacent compartments 58 and 60 being such that the highest pressure is in the compartment towards which the diaphragm 56 is pointed, it will automatically "flip" or pass through an over-center position as a result of an internal spring or spring-like action and the applied pressure so as to point in the other direction without stopping between these two positions. As this occurs, the forces causing the movement of a diaphragm 56 will be transmitted to the valve spool 38 so as to shift the spool 38 either from the first position previously described to the second position or vice versa depending upon the direction of the diaphragm 56 reorientation.

Normally the diaphragm 56 employed will be of such a nature that it will be completely stable in either of the two positions described until a pressure differential is applied which is sufficient to cause its deflection from either position to the other. However, in some applications, it is possible to make the diaphragm 56 more or less like a bowed oil can bottom so that it is metastable in character. In this case a lesser amount of force has to be applied to one side of it to hold it in a second position that had to be applied to the same side of it to move it from a first position to the second. The use of a metastable diaphragm 56 is not normally preferred with the invention since as the valves 12 are normally used it is necessary for them to be bistable.

Although it is possible to manufacture the diaphragm 56 and the shaft 70 so that they are separate from the valve spool 38 and to connect these parts together using mechanical fasteners (not shown) it is considered to be highly preferable to form these parts as an integral unit out of a material such as a known blend of 85% polyethylene and 15% of a vinal polymer or other currently known polymers or mixtures having similar or better resilient and sealing characteristics than polypropylene in manufacturing the valve spool 38. If desired, the spool 38 and/or the diaphram 56 can be formed of a known copper alloy. Such a combination structure (not separately numbered) can be easily manufactured by injection molding techniques; it can be easily assembled in the housing body 14 during the manufacture of a valve 12 and can be just as easily replaced if this should become necessary. Further, there is no danger of the parts of such a unitary structure separating during either storage or normal use.

It is considered that a operation of a single valve 12 will be essentially self-evident from a consideration of the preceding. Since the operation of a dual valve structure 10 is closely related to the operation of a single valve 12, the operation of the valve structure 12 is not separately described herein. When a single valve 12 is to be used a fluid under pressure such as compressed air will randomly be supplied to the inlet port 24 so that it can be directed to either of the service or supply ports 26 or 30 depending upon the configuration of the actuation means 46. At such time these ports 26 and 30 will normally be connected to auxiliary structures (not shown) such as inflatable tubes in a cushion in which the internal pressure will increase as air is supplied from the port 24 or will be closed off.

When the diaphragm 56 is in the position as shown in either FIGS. 1 or 6 where it is more or less pointed away from the bore 20 the valve spool 38 will be located so that fluid will be supplied through the supply port 26 within the extension 28 to the tumbular connector 64 and thence to the second compartment 60. This will result in pressure being applied against the diaphragm 56 at the end of it within the second compartment 60. When this pressure builds up to a value dependent upon the specific diaphragm 56 used the diaphragm 56 will rapidly change in configuration so that it is pointed more or less in the direction of the bore 20. This will, of course, shift the valve spool 38.

In the new position of the valve spool 38 the inlet port 24 will be in communication with the supply port 30 within the extension 32. Since this port 30 is in communication with the first compartment 58 through the first tubular connector 62 this will result in a gradual build up of pressure against the diaphragm 56. When this pressure again builds up to a value dependent upon the specific diagram used this diaphragm 56 will again rapidly change in configuration. This will, of course, resume the sequence previously described as a result of the movement of the valve spool 38 back to its original position.

As a valve 12 is normally used the service or supply port 26 or 30 which is not under pressure at any particular instance will normally be utilized to convey spent or return fluid back to the valve 12. It is considered it will be obvious how such spent or returned fluid is vented to the ambient through the vents 34 and 36 during the operation of the valve 12. It is important to note that the movement of the valve spool 38 is not impeded as a result of any air accumulating within the bore 20 remote from the actuating means 46 since the bore 20 is open ended. It is also considered important to note that because of the inherent characteristics of the diaphragm 56 this diaphragm inherently can only be stable in either of the two positions described and hence the valve spool 38 will be rapidly moved between the two positions indicated so as to obtain a quick or rapid diversion of fluid.

The time cycle at which the actuating means 46 will reverse will, of course, be dependent upon a number of factors. The longer the period it takes for sufficient pressure to accumulate to move the diaphragm 56 from one of its positions to the other the longer the time interval before the diaphragm snaps or moves from one configuration to the other. Many expedients are known which can be utilized in order to delay the pressure build up in a chamber next to the diaphragm 56; such expedients can be used to delay the time interval before the diaphragm 56 changes from a first stable configuration to a second stable configuration. It is considered that normally it will be most expedient to increase the time cycle by inserting a flow impediment such as an orifice or a valve which opens so as to pass a fluid under pressure in either or both of the connectors 62 or 64.

Valves such as the valve 12 can be constructed in this manner so that the time necessary for the diaphragm 56 to move from a first position to a second is different from the time necessary for the diaphragm 56 to move from the second back to the first. Normally they do not need to be changed or altered when a vacuum instead of a pressurized fluid is to be used to operate them. When a vacuum is used to operate a valve 12 the mode of operation substantially corresponds to that described.

Figure 7:
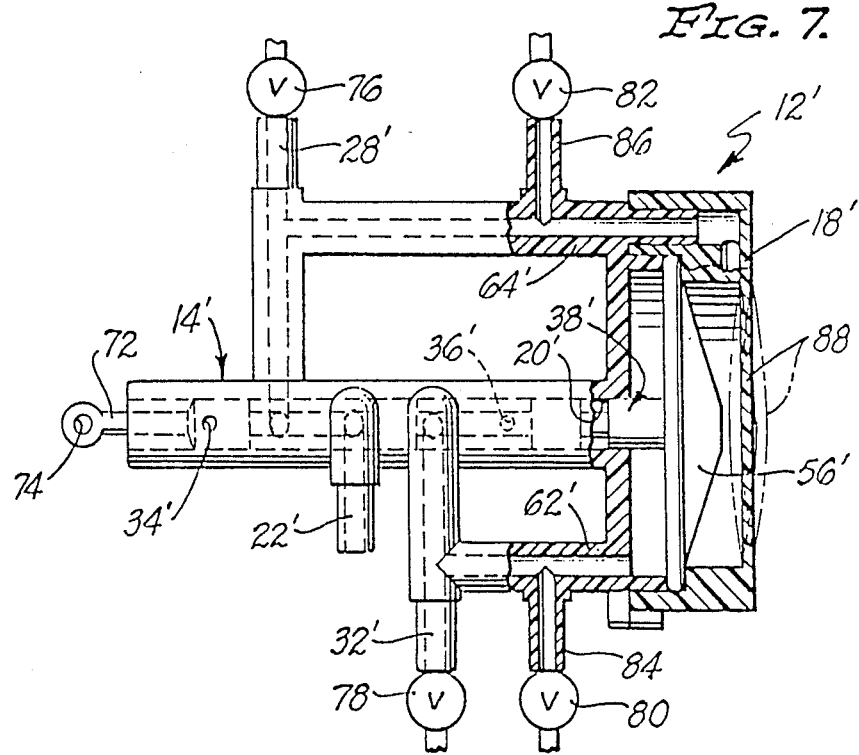
FIG. 7 is a view similar to FIG. 6 of a modified valve of the invention which is useful as a motor.

In FIG. 7 of the drawings there is shown a modified valve 12' which is substantially similar to the valve 12 but which is constructed so that its operation can be controlled in a nimber of different ways. This valve 12' also differs from the valve 12 in that it is capable of being used as a motor in order to provide mechanical power. In this figure the primes of the same numerals and in connection with the valve 12 are employed in the interest of brevity. The various parts designated in this manner are not separately described herein.

In this valve 12' an extension 72 is located on the valve spool 38' so as to project from the housing body 14' as shown. A hole 74 is provided in this extension 72 so that it can be mechanically coupled to a link or the like (not shown) to be driven in order to supply mechanical power. Also valves 76 and 78 are provided in the extensions 28' and 32' in the valve 12'. Other valves 80 and 82 are provided in nipples 84 and 86 to serve as laterials off of the connectors 62' and 64', respectively. Further, the valve 12' differs from the valve 12 in that the center region 88 of the end cap 18' is thinned down so as to be somewhat flexible.

The purpose of the extension 72 is, of course, obvious from the preceding. The various valves 76, 78, 80, and 82 are provided for use in regulating the operation of the valve 12'. With this valve 12' a plurality of pressure inputs can be employed in order to "operate" or "snap" the diaphram 56' from one position to another. Further, these valves 76, 78, 80, and 82 can be adjusted so as to vary the pressure drop through or across them. This can be desirable in accomplishing precise adjustment of a complete "system" in which the valve 12' is used so that the valve 12' is operated precisely as desired. The cap 18' shown is constructed as shown so that the central region 88 is suffeciently flexible so as to be capable of acting in the manner of an accumulator bladder (not shown) in connection with the valve 12' so as to provide an alternate control of the operation of the valve 12'.

From the preceding discussion it will be apparent that in a preferred valve 12 the operation of the actuating means 46 is inherently connected with the operation of the valve 12. However, it is to be noted that the broad concepts of the present invention can be achieved in valves in which the extensions in which the tubular connectors 62 and 64 are not connected to the extensions 28 and 32, but instead are utilized as nipples so as to supply fluid under pressure to control the orientation or position of the diaphragm 56. Such valves do not utilized a feedback mechanism as is inherent with a valve 12 as previously described.

Figure 8:
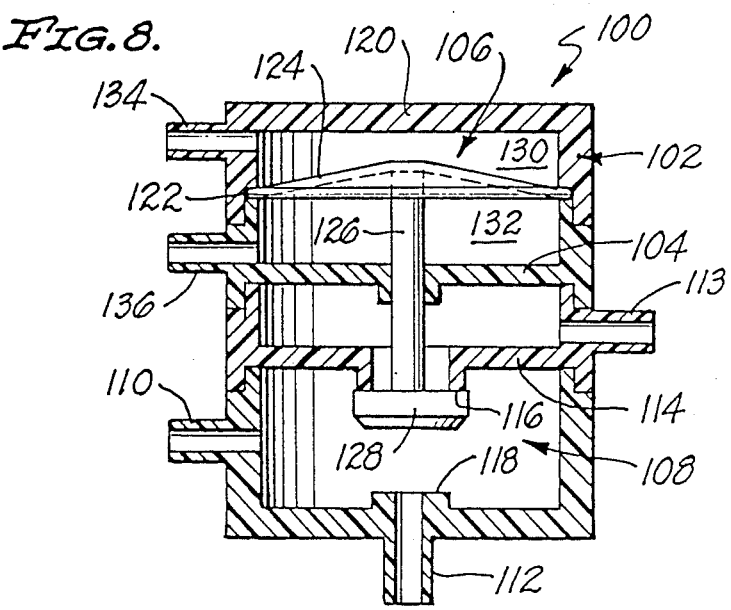
FIG. 8 is a cross-sectional view of a modified form of a valve in accordance with this invention. The various valves or valve structures illustrated in the drawings are all constructed so as to utilize the broad concepts of the invention set forth in the appended claims forming a part of this document. Through the use or exercise of routine engineering skill in the valve field, these concepts can be embodied within other differently appearing and/or differently constructed valves. For this reason the invention is not to be considered as being limited so as to only encompass valves appearing as those valves illustrated in the drawings.

An example of this type of a controlled valve is shown in FIG. 8 of the drawing. Here there is shown a valve 100 having a housing 102 which is divided by an internal wall 104 into an upper actuating portion 106 and a lower valve portion 108. Within the valve portion 108 there is an inlet port 110, a centrally located outlet port 112 and another outlet port 113. An internal wall 114 within the valve portion 108 is provided with a centrally located valve seat 116 in alignment with another valve seat 118 located as an extension of the outlet port 112. In the valve 100 the actuating portion 106 is closed off by a lid 120 in such a manner that this lid 120 holds the periphery 122 of a bistable diaphragm 124 reasonably corresponding to the diaphragm 56 previously described. This diaphragm carries a centrally located valve body 126 which extends through the valve seat 116. This valve body 126 is provided with a sealing head 128 which is normally located against either of the two seats 116 and 118 depending upon the position of the diaphragm 124.

This position is normally determined by the differential in the pressures applied to first and second compartments 130 and 132 located within the actuating portion 106 from control ports, 134 and 136 respectively. Depending upon the position of this diaphragm 128 fluid from the inlet port 110 will be directed to either the outlet port 112 or the outlet port 113. These two control ports 134 and 136 can, if desired, be connected back to the outlet ports 112 and 113 so that the valve 100 has a mode of operation corresponding to that of the valve 10 previously described.

CROSS-REFERENCE TO RELATED APPLICATION

This application is related to the concurrently executed U.S. patent application by the inventors named herein entitled "Method and Apparatus for Causing a Series of Mechanical Action." The entire disclosure of this related application is incorporated herein by reference.

We claim:

1. A valve including a housing, said housing having an internal cavity, an inlet and two outlet ports located in said housing so as to lead into the interior of said cavity, said valve also including a valve body located within said cavity, said valve body being capable of being moved between a first position in which it places said inlet port in communication with one of said outlet ports and a second position in which it closes off the one of said outlet ports, said valve also including actuating means for moving said valve body between said first and second positions, said actuating means being connected to said valve body in which the improvement comprises:

said cavity is an elongated bore within said housing, said valve body is a valve spool which is capable of being moved along the length of said bore in being shifted between said first and second positions, said actuating means including wall means defining a hollow cavity, a diaphragm means having two positions of stability locate within said cavity and having its periphery held by said wall means so as to divide said cavity into two compartments, a first control port leading through said wall means into a first of said compartments, a second control port leading through said wall means into a second of said compartments, and mechanical means connecting the center of said diaphragm means to said valve body, said diaphragm means, said mechanical means and said valve body being physically related so that in a first stable position of said diaphragm means said valve body is in said first position and in the second stable position of said diaphragm means said valve body is in said second position, said diaphragm means being responsive to the fluid pressure differential between said compartments so as to be oriented in either of said positions of said diaphragm means in accordance with such differential, the center of said diaphragm means is aligned with said bore in both of said positions and in moving between said positions, and said mechanical means is a rigid member extending in alignment with said bore.

2. A valve as claimed in claim 1 wherein:
said diaphragm means, said mechanical means and said valve body are integral with one another and are formed of the same material.

3. A valve as claimed in claim 2 wherein:
said diaphragm means is a metastable diaphragm and is substantially conical in either of said orientations.

4. A valve including a housing, said housing having an internal cavity, an inlet port and first and second service ports located in said housing so as to lead into the interior of said cavity, said ports being spaced from one another, said valve also including a valve body located within said cavity, said valve body being capable of being moved between a first position in which it places said inlet port in communication with said first of said service ports and out of communication with said second service port and a second position in which it places said inlet port in communication with said service port and out of communication with said first service port, said valve also including actuating means for moving said valve body between said first and second positions connected to said valve body in which the improvement comprises:

said cavity is an elongated bore within said housing, said valve body is a valve spool which is capable of being moved along the length of said bore in being shifted between said first and second positions, said valve spool being capable of sealing against the interior of said bore to prevent leakage, said actuating means including wall means defining a hollow cavity, a bistable diaphragm means having two positions of stability in each of which it has a substantially conical shape, said diaphragm means being located within said cavity so that its periphery is held by said wall means so as to divide said cavity into two compartments, a first control port leading through said wall means into a first of said compartments, as second control port leading through said means into a second of said compartments, a shaft connecting the center of said diaphragm means to said valve body, said shaft being capable of transmitting a mechanical force from said diaphragm means to said valve spool without apparent flexiture or elongation, the center of said diaphragm means being aligned with said bore in both of said orientations and in moving between said orientations, said diaphragm means, said shaft and said valve body being physically related so that in a first stable position of said diaphragm means said valve body is in said first position and in the second stable position of said diaphragm means said valve body is in said second position, said diaphragm means being responsive to the fluid pressure differential between said compartments so as to be oriented in either of said positions of said diaphragm means in accordance with such differential said diaphragm means, said mechanical means and said valve spool are integral with one another and are formed of the same material, said material is a polymer having resilient, elastomeric properties such that said diaphragm is capable of flexing in moving from its first position to its second position.

5. A motor including a housing, said housing having an internal cavity, inlet and outlet ports located in said housing so as to lead into the interior of said cavity, said motor also including a valve body located within said cavity, said valve body being capable of being moved between a first position in which it places said inlet port in communication with said outlet port and second position in which it closes off said outlet port, said motor also including actuating means for moving said valve body between said first and second positions connected to said valve body in which the improvement comprises:

said actuating means including wall means defining a hollow cavity, a diaphragm means having two positions of stability located within said cavity and having its periphery held by said wall means so as to divide said cavity into two compartments, a first control port leading through said wall means into a first of said compartments, a second control port leading through said wall means into a second of said compartments, and mechanical means connecting the center of said diaphragm means to said valve body, said diaphragm means, said mechanical means and said valve body being physically related so that in a first stable position of said diaphragm means said valve body is in said first position and in the second stable position of said diaphragm means said valve body is in said second position, said diaphragm means being responsive to the fluid pressure differential between said compartments so as to be oriented in either of said positions of said diaphragm means in accordance with such differential, said valve body including means for coupling said valve body to a member to be driven by said motor, said means extending from said housing, a first passage means connecting one of said outlet ports to the interior of said cavity and one side of said diaphragm means, and a second passage means connecting the other of said outlet ports to the interior of said cavity at the other side of said diaphragm means.

6. A motor as claimed in claim 5 wherein:
said diaphragm means, said mechanical means and said valve body are integral with one another and are formed of the same material.

7. A motor including a housing, said housing having an internal cavity, a spaced inlet and first and second spaced service ports located in said housing so as to lead into the interior of said cavity, said housing also including a valve body located within said cavity, said valve body being capable of being moved between a first position in which it places said inlet port in communication with said first of said service ports and out of communication with said second service port and second position in which it places said inlet port in communication with said second service port and out of communication with said first service port, said motor also including actuating means for moving said valve body between said first and second positions connected to said valve body in which the improvement comprises:

said cavity is an elongated bore within said housing, said valve body is a valve spool which is capable of being moved along the length of said bore in being shifted between said first and said second positions, said actuating means including wall means defining a hollow cavity, a bistable diaphragm means having two positions of stability in which it has a substantially conical shape located within said cavity and having its periphery held by said wall means so as to divide said cavity into two compartments, a first control port leading through said wall means into a first of said compartments, a second control port leading through said wall means into a second of said compartments, and rigid mechanical means connecting the center of said diaphragm means to said valve body, the center of said diaphragm means is aligned with said bore in both of said orientations and in moving between said orientations, said diaphragm means, said mechanical means and said valve body being physically related so that in a first stable position of said diaphragm means said valve body is in said first position and in the second stable position of said diaphragm means said valve body is in said second position, and said diaphragm means being responsive to the fluid pressure differential between said compartments so as to be oriented in either of said positions of said diaphragm means in accordance with such differential, said valve spool including means for coupling said valve spool to a member to be driven by said motor, first passage means connecting said first service port to said cavity at one side of said diaphragm means, second passage connecting said second service port to said cavity at the other side of said diaphragm means, said diaphragm means, said mechanical means and said valve spool are integral with one another and are formed of the same material, said material is a polymer having resilient, elastomeric properties such that said diaphragm is capable of flexing in moving from its first position to its second position, said valve spool is capable of sealing against the interior of said bore to prevent leakage and said mechanical means is capable of transmitting a mechanical force from said diaphragm means to said valve spool without apparent flexure or elongation.

* * * * *